J. W. ROBERTS.
FLEXIBLE PIPE CONNECTION.
APPLICATION FILED JUNE 20, 1911.
1,023,274.
Patented Apr. 16, 1912.
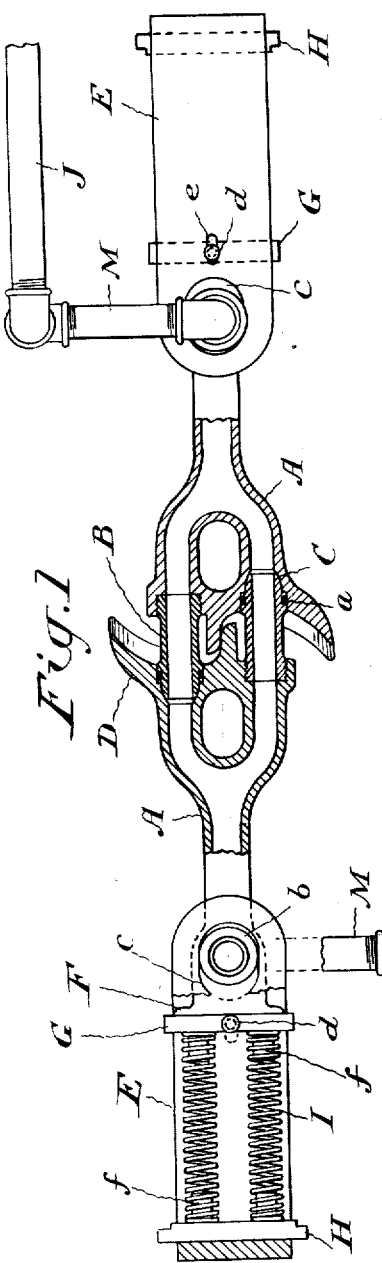
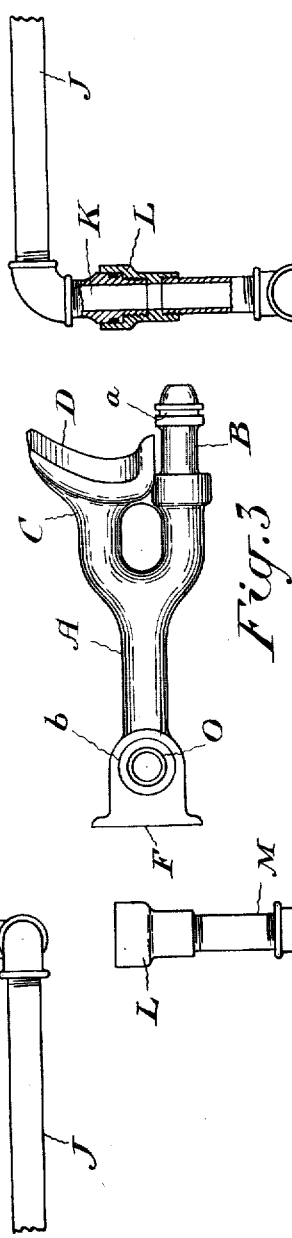
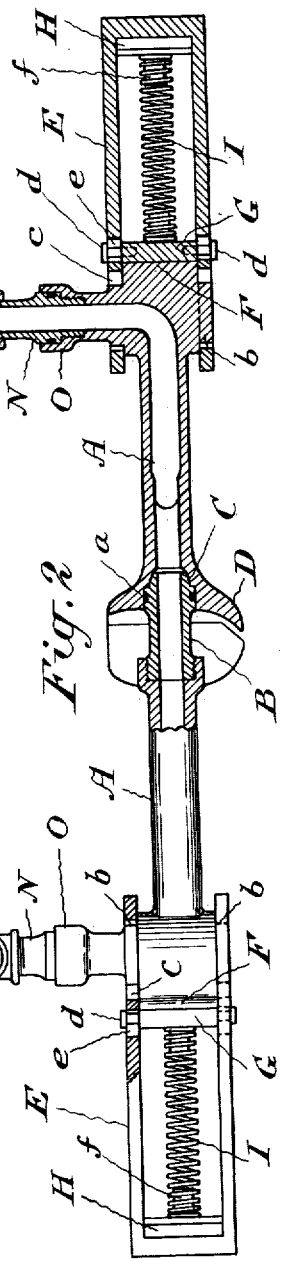
WITNESSES:
W. J. McMillan
E. P. Hall
INVENTOR.
John W. Roberts
BY J. Edward Maybee
ATTORNEY.
COLUMBIA PLANOGRAPH CO., WASHINGTON, D. C.

UNITED STATES PATENT OFFICE.

JOHN W. ROBERTS, OF SARNIA, ONTARIO, CANADA.

FLEXIBLE PIPE CONNECTION.

1,023,274. Specification of Letters Patent. Patented Apr. 16, 1912.

Application filed June 20, 1911. Serial No. 634,288.

*To all whom it may concern:*

Be it known that I, JOHN W. ROBERTS, of the town of Sarnia, in the Province of Ontario, Canada, have invented certain new and useful Improvements in Flexible Pipe Connections, of which the following is a specification.

This invention relates particularly to connections for joining piping carried on bodies having a limited movement relative to one another such as railway rolling stock and my object is to devise connections which will possess the necessary flexibility without the use of rubber hose and the like and which will couple automatically when two cars are brought together.

I attain my object by yieldingly supporting two Y-shaped connection pipes on adjacent car ends each Y being formed with one tongue and one socket branch and shaped so that the parts are guided into proper coupling relationship when the Y's are brought end to end. The Y-connections are coupled to the pipe systems of the cars by hinge jointed pipe sections adapted to permit of the Y-connections moving freely to accommodate themselves to the relative movements of the two cars.

Figure 1 is a plan view partly in section of my pipe connections. Fig. 2 is a side elevation of the same partly in section. Fig. 3 is a plan view of one of the Y-connections.

In the drawings like letters of reference indicate corresponding parts in the different figures.

A are Y-shaped connection pipes supported on adjacent car ends. As the installation for one car end is exactly similar to that for the other the description of one will apply to both. The Y-shaped connection pipe is provided at its outer end with the tongue B and the socket branch C adapted to engage with the socket and tongues respectively of an opposed Y-connection. The tongues are preferably detachable being screwed in place as shown. The sockets are preferably cone shaped and the tongues are necessarily similarly shaped to engage them. A packing ring $a$ suitably set on the tongue serves to make a tight joint when the parts are in engagement. As it is the intention that the connection pipes shall automatically couple the socket C is surrounded by a bell mouth D adapted to guide an opposed tongue into place.

Automatic coupling requires that the Y-shaped connection pipes shall be yieldingly supported and spring pressed toward one another. For this purpose I provide the following construction. The inner end of the Y-connection has trunnions $b$ formed thereon journaled in elongated holes $c$ in the support E which is similar to the support for the ordinary draw heads. These elongated holes permit of a certain amount of vertical rock on the part of the Y-connection. The inner end of the pipe is provided with the abutting piece F which is preferably flat on its rear face and extended laterally to the full width of the support. Behind the abutting piece is located the follower G which is held in place by the central pins $d$ having a bearing in longitudinal slots $e$ in the top and bottom of the support.

H is a part which when the device is in use will be fixed to the car. Between the fixed part H and the follower G I arrange spring means normally in compression. I preferably employ two coil springs I fitting over teats $f$ on the follower and the fixed part. These springs normally project the Y-shaped connection and at the same time by the engagement of the follower G with the abutting piece F tend to yieldingly maintain the connection in its central position. By the construction described the Y-connections will accommodate themselves freely to the relative movements of the two cars with the pipe systems of which they are connected.

As the Y-connections have a longitudinal movement relative to the cars flexible connections must be provided with the fixed pipe system of the car. This pipe is provided with a downwardly projected nipple K fitting within the vertical socket L on one branch of a Z-pipe M arranged transversely of the car. The lower end of this Z-pipe M is provided with the nipple N adapted to fit the vertical socket O formed on the Y-connection pipe A. These nipple and socket ends are preferably similar to the corresponding parts of the Y-shaped connection pipes in most respects, but the lower part of each nipple is preferably threaded to engage a correspondingly threaded part of the socket. The hinged joints formed by these parts are thus prevented from disengaging while sufficient freedom of movement is provided to allow for the swinging of the Z-connection to accommodate itself to the varying relative positions of the Y-shaped connection A and the fixed pipe J.

By the construction described it will be seen that I am enabled to obtain a connection for air or steam pipes which will be perfectly flexible without requiring the use of rubber hose and the like.

Many of the details of construction may of course be widely varied without departing from the spirit of my invention.

What I claim as my invention is:—

1. In pipe connections the combination of a connection pipe adapted at its outer end for engagement with a similar pipe; a support for said pipe on which the pipe is vertically trunnioned; a fixed part on which said support is slidable; and spring means engaging the pipe and the fixed part normally tending to extend the said support and at the same time tending to maintain the pipe in alinement with the support.

2. In pipe connections the combination of a connection pipe adapted at its outer end for engagement with a similar pipe; a support for said pipe on which the pipe is vertically trunnioned, the support being provided with longitudinally elongated bearings for the trunnions; a fixed part on which said support is slidable; and spring means engaging the pipe and the fluid part normally tending to extend the said support and at the same time tending to maintain the pipe in alinement with the support.

3. In pipe connections the combination of a connection pipe adapted at its outer end for engagement with a similar pipe; a support for said pipe on which the pipe is vertically trunnioned; a fixed part on which said support is slidable; an abutting piece formed on the inner end of the pipe; a follower suitably guided in the support and engaging the abutting piece; and spring means engaging the fixed part and the follower tending to extend the support and to maintain the pipe in alinement with the support.

4. In pipe connections the combination of a connection pipe adapted at its outer end for engagement with a similar pipe; a support for said pipe on which the pipe is vertically trunnioned, the support being provided with longitudinally elongated bearings for said trunnions; a fixed part on which said support is slidable; an abutting piece formed on the inner end of the pipe; a follower vertically trunnioned in the support, the support being provided with longitudinally elongated bearings for the follower trunnions; and spring means engaging the fixed part and the follower tending to extend the support and to maintain the pipe in alinement with the support.

5. In pipe connections the combination of a connection pipe adapted at its outer end for engagement with a similar pipe; a support for said pipe on which the pipe is vertically trunnioned; a fixed part on which said support is slidable; an abutting piece formed on the inner end of the pipe; a follower suitably guided in the support and engaging the abutting piece, the said follower being vertically journaled in the support which latter is provided with longitudinally elongated bearings for the trunnions; and spring means engaging the fixed part and the follower tending to extend the support and to maintain the pipe in alinement with the support.

This ninth day of June 1911.

JOHN W. ROBERTS.

Signed in the presence of—
Jno. R. Logan,
Annie R. Mudie.

---

Copies of this patent may be obtained for five cents each, by addressing the "Commissioner of Patents, Washington, D. C."